(12) United States Patent
Campton

(10) Patent No.: US 10,151,359 B2
(45) Date of Patent: Dec. 11, 2018

(54) ROTATING MULTI-MODE CLUTCH MODULE WITH STATIONARY ACTUATOR

(71) Applicant: BorgWarner Inc., Auburn Hills, MI (US)

(72) Inventor: Calahan Campton, Royal Oak, MI (US)

(73) Assignee: BorgWarner Inc., Auburn Hills, MI (US)

( * ) Notice: Subject to any disclaimer, the term of this patent is extended or adjusted under 35 U.S.C. 154(b) by 252 days.

(21) Appl. No.: 15/163,444

(22) Filed: May 24, 2016

(65) Prior Publication Data

US 2017/0343061 A1   Nov. 30, 2017

(51) Int. Cl.
*F16D 41/16*   (2006.01)
*F16D 41/14*   (2006.01)
*F16D 23/12*   (2006.01)

(52) U.S. Cl.
CPC .............. *F16D 41/16* (2013.01); *F16D 41/14* (2013.01); *F16D 2023/123* (2013.01)

(58) Field of Classification Search
CPC .......... F16D 41/02; F16D 41/12; F16D 41/14; F16D 41/16; F16D 23/12; F16D 2023/123
See application file for complete search history.

(56) References Cited

U.S. PATENT DOCUMENTS

| 5,967,277 | A | | 10/1999 | Walter |
| 5,992,592 | A | * | 11/1999 | Showalter ............... F16D 41/16 |
| | | | | 192/43.1 |
| 2002/0063027 | A1 | | 5/2002 | Karambelas et al. |
| 2004/0110598 | A1 | | 6/2004 | Blair et al. |
| 2006/0185957 | A1 | | 8/2006 | Kimes et al. |

FOREIGN PATENT DOCUMENTS

WO   WO 2014120595 A1   8/2014
WO   WO-2015/164190 A1   10/2016

OTHER PUBLICATIONS

International search report and written opinion issued in related PCT Application No. PCT/US17/34219 report dated Aug. 21, 2017.

* cited by examiner

*Primary Examiner* — Richard M Lorence
(74) *Attorney, Agent, or Firm* — Miller, Matthias & Hull LLP

(57) ABSTRACT

A multi-mode clutch module for connecting two components rotating relative to each other may include an outer race, an inner race and pawls coupled to the inner race and movable between engagement to and disengagement from the outer race to alternately lock and unlock the races for relative rotation in one or both directions. A cam ring and a plurality of cams extending therefrom are coupled to the inner race for rotation therewith and for axial movement parallel to a rotational axis of the races. A shift ring is operatively connected between the cam ring and a shift drum such that rotation of the shift drum caused by a stationary actuator causes translation of the shift ring to move the cam ring and cams so the cams engage the pawls to move the pawls between their locked and unlocked positions.

20 Claims, 7 Drawing Sheets

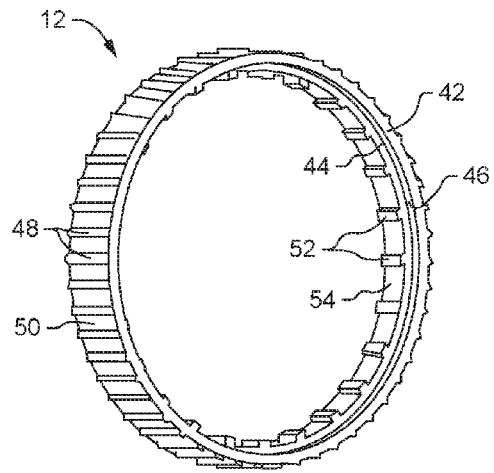
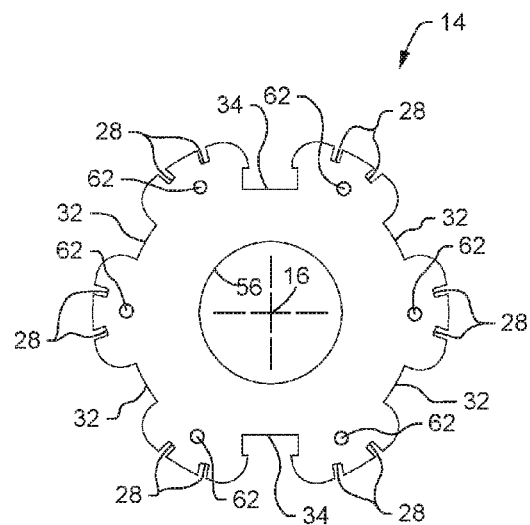
FIG. 3
FIG. 4
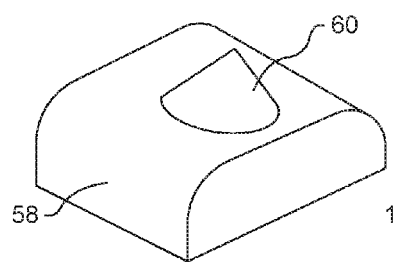
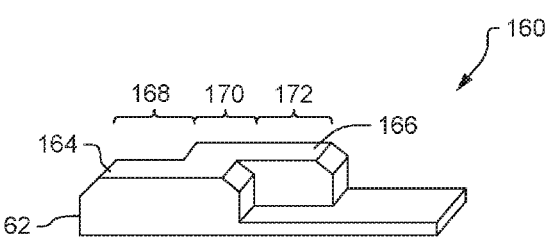
FIG. 5
FIG. 15

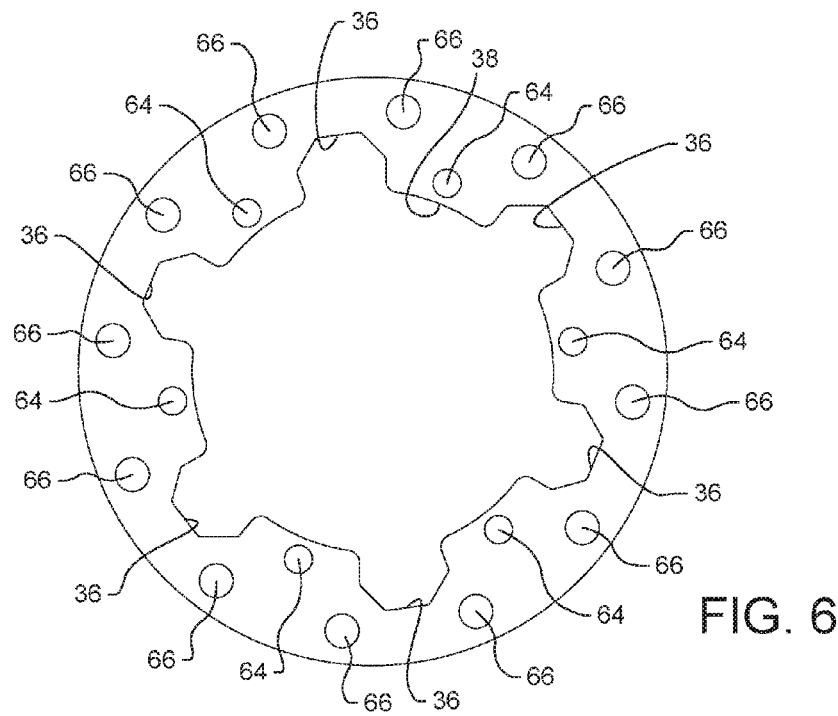
FIG. 6
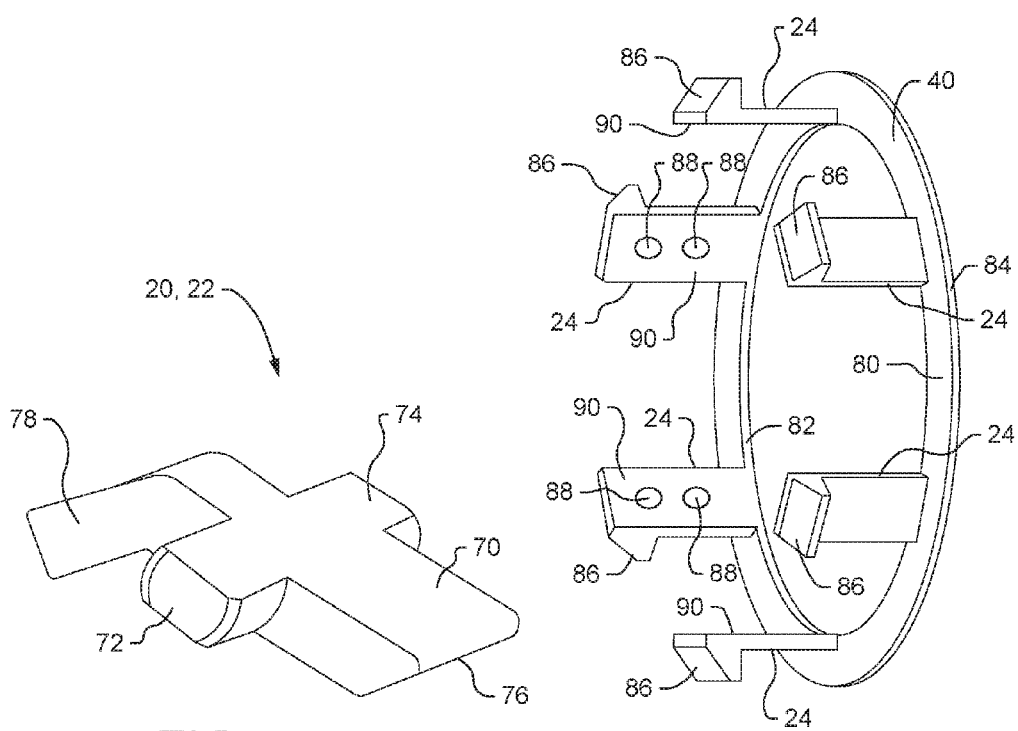
FIG. 7
FIG. 8

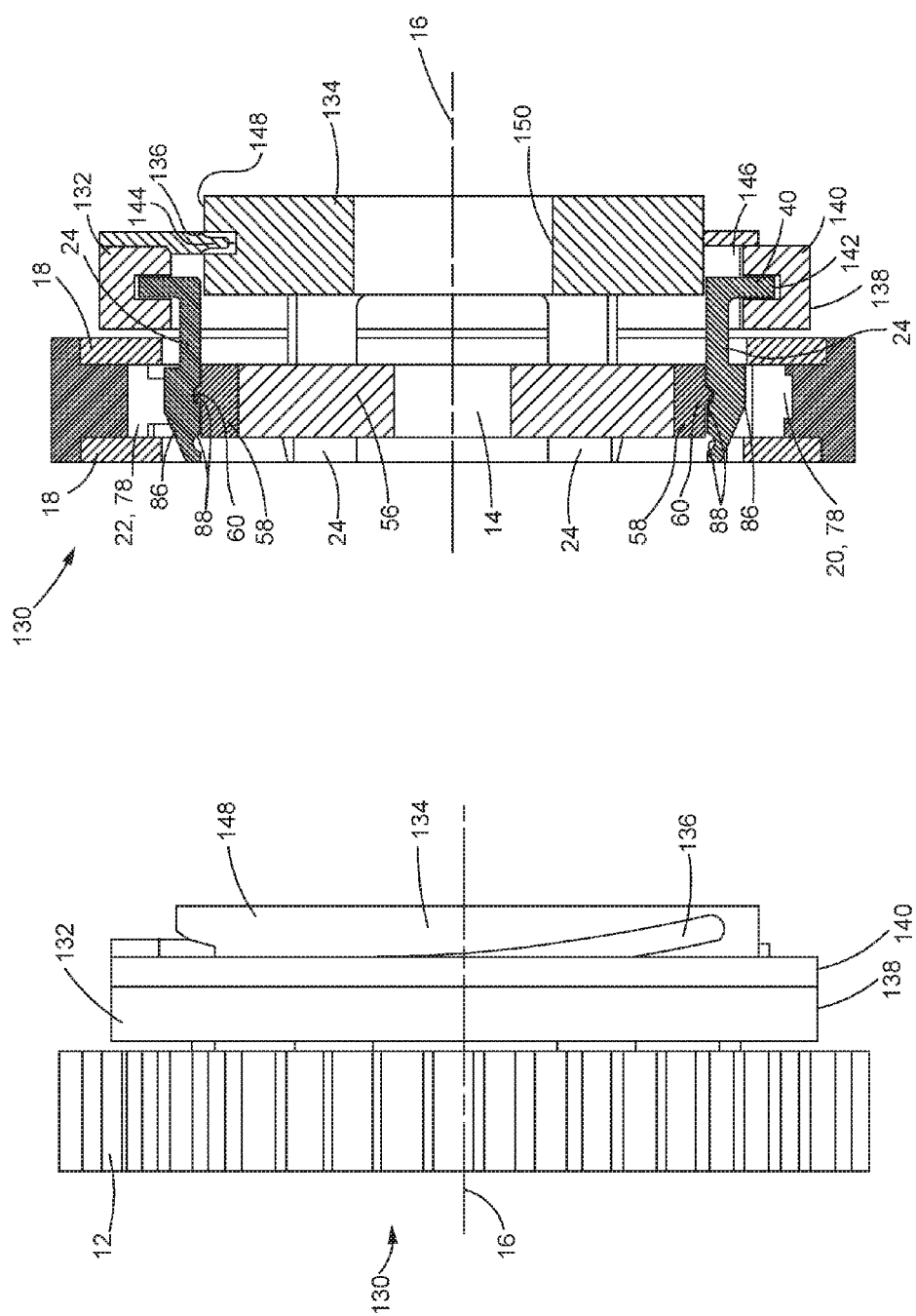

ROTATING MULTI-MODE CLUTCH MODULE WITH STATIONARY ACTUATOR

TECHNICAL FIELD

This disclosure relates generally to clutches, and in particular to clutches having multiple modes of engagement between two element rotating relative to each other for selectively locking the elements against relative rotation with respect to each other in one or both directions.

BACKGROUND

An automotive vehicle typically includes an internal combustion engine containing a rotary crankshaft configured to transfer motive power from the engine through a driveshaft to turn the wheels. A transmission is interposed between engine and driveshaft components to selectively control torque and speed ratios between the crankshaft and driveshaft. In a manually operated transmission, a corresponding manually operated clutch may be interposed between the engine and transmission to selectively engage and disengage the crankshaft from the driveshaft to facilitate manual shifting among available transmission gear ratios. On the other hand, if the transmission is automatic, the transmission will normally include an internal plurality of automatically actuated clutch units adapted to dynamically shift among variously available gear ratios without requiring driver intervention. Pluralities of such clutch units, also called clutch modules, are incorporated within such transmissions to facilitate the automatic gear ratio changes.

Multi-mode clutch modules (MMCMs) have become an important part of transmission designs in order to meet government fuel efficiency standards. The MMCMs can take the place of friction plates that are currently used in many applications. This is accomplished using two sets of pawls (a forward pawl set and a reverse pawl set) that are moved by an actuator of the MMCM. The forward pawl set will prevent rotation in one direction (clockwise will be used for clarification, but the direction of the rotation depends on the transmission design) and the reverse pawl set prevents rotation in the opposite direction (i.e., counterclockwise as used herein). The pawls are designed to be movable between engaged and disengaged positions to alternately lock and unlock an inner race relative to an outer race or notch ring of the MMCM. The forward and reverse pawl sets can be actuated in concert or independently to provide up to four modes for the MMCM: locked in both directions, one-way locking in the clockwise direction, one-way locking in the counterclockwise direction, and unlocked to allow free rotation in both directions.

In some applications, a clutch is used to connect two members that are both rotating. In many of these applications, however, it is not practical to have an actuator that rotates with the inner race or the outer race. Rotation of the actuator along with the race on which it is mounted can cause wires of the actuator to twist or create excessive drag on the MMCM that can reduce the efficiency of the vehicle or other machine in which the MMCM is implemented.

SUMMARY OF THE DISCLOSURE

In one aspect of the present disclosure, a clutch module for coupling a first rotating component and a second rotating component of a machine to each other is disclosed. The clutch module includes an outer race configured to be coupled to and to rotate with the first rotating component, wherein the outer race is rotatable in both directions about a clutch rotational axis, an inner race configured to be coupled to and to rotate with the second rotating component, wherein the inner race is concentrically aligned with the outer race and rotatable in both directions relative to the outer race about the clutch rotational axis, and a first pawl operatively coupled to one of the inner race and the outer race to rotate therewith and to move between a first pawl locked position where the first pawl engages to prevent rotation of the inner race relative to the outer race in a first direction and a first pawl unlocked position where the first pawl is disengaged to allow rotation of the inner race relative to the outer race in the first direction. The clutch module may further include a first cam operatively coupled to the one of the inner race and the outer race to rotate therewith and to translate relative to the inner race and the outer race parallel to the clutch rotational axis, a shift ring operatively coupled to a stationary structure of the machine and constrained to translate parallel to the clutch rotational axis, and operatively coupled to the first cam so that translation of the shift ring causes translation of the first cam and so that the first cam can rotate about the clutch rotational axis relative to the shift ring, and a shift drum operatively coupled to the stationary structure of the machine and constrained to rotate about a shift drum axis that is parallel to the clutch rotational axis. The shift drum may be operatively coupled to the shift ring so that rotation of the shift drum causes the shift ring and the first cam to translate. The shift drum is rotatable to a first angular position wherein the first cam is disengaged from the first pawl and the first pawl is in the first pawl locked position, and to a second angular position wherein the first cam engages the first pawl to move the first pawl to the first pawl unlocked position.

In another aspect of the present disclosure, a clutch module for coupling a first rotating component and a second rotating component of a machine to each other. The clutch module may include an outer race configured to be coupled to and to rotate with the first rotating component, wherein the outer race is rotatable in both directions about a clutch rotational axis, an inner race configured to be coupled to and to rotate with the second rotating component, wherein the inner race is concentrically aligned with the outer race and rotatable in both directions relative to the outer race about the clutch rotational axis, a first pawl operatively coupled to one of the inner race and the outer race to rotate therewith and to move between a first pawl locked position where the first pawl engages to prevent rotation of the inner race relative to the outer race in a first direction and a first pawl unlocked position where the first pawl is disengaged to allow rotation of the inner race relative to the outer race in the first direction, and a second pawl operatively coupled to the one of the inner race and the outer race to rotate therewith and to move between a second pawl locked position where the second pawl engages to prevent rotation of the inner race relative to the outer race in a second direction and a second pawl unlocked position where the second pawl is disengaged to allow rotation of the inner race relative to the outer race in the second direction. The clutch module may further include a first cam operatively coupled to the one of the inner race and the outer race to rotate therewith and to translate relative to the inner race and the outer race parallel to the clutch rotational axis, a cam ring having an annular shape and oriented concentrically with the outer race and the inner race about the clutch rotational axis, wherein the first cam extends axially from the cam ring so that the cam ring rotates with the one of the inner race and the outer race and the cam ring and the first cam translate together relative to the inner race and the outer race parallel to the clutch rotational axis, a shift ring operatively coupled to a stationary structure of the machine and constrained to translate parallel to the clutch rotational axis, and operatively coupled to the cam ring so that translation of the shift ring causes translation of the cam ring and the first cam, and so that the cam ring is rotatable about the clutch rotational axis relative to the shift ring, and a shift drum operatively coupled to the stationary structure of the machine and constrained to rotate about a shift drum axis that is parallel to the clutch rotational axis. The shift drum may be operatively coupled to the shift ring so that rotation of the shift drum causes the shift ring, the cam ring and the first cam to translate. The shift drum is rotatable to a first angular position wherein the first cam is disengaged from the first pawl and the first pawl is in the first pawl locked position and disengaged from the second pawl and the second pawl is in the second pawl locked position, and to a second angular position wherein the first cam engages the first pawl to move the first pawl to the first pawl unlocked position and engages the second pawl to move the second pawl to the second pawl unlocked position.

Additional aspects are defined by the claims of this patent.

BRIEF DESCRIPTION OF THE DRAWINGS

FIG. 3 is an isometric view of an outer race or notch ring in accordance with the present disclosure of the MMCM of FIG. 1;

FIG. 4 is a front view of an inner race in accordance with the present disclosure of the MMCM of FIG. 1;

FIG. 5 is an isometric view of a detent block in accordance with the present disclosure of the MMCM of FIG. 1;

FIG. 6 is a front view of a side plate in accordance with the present disclosure of the MMCM of FIG. 1;

FIG. 7 is an isometric view of a pawl in accordance with the present disclosure of the MMCM of FIG. 1;

FIG. 8 is an isometric view of a cam ring and associated cams in accordance with the present disclosure of the MMCM of FIG. 1;

FIG. 13 is a side view of any alternative embodiment of a rotating MMCM having a stationary actuator in accordance with the present disclosure;

FIG. 14 is a side cross-sectional view of the MMCM of FIG. 13; and

FIG. 15 is an isometric view of an alternative embodiment of a cam in accordance with the present disclosure of the MMCMs of FIGS. 1 and 13.

DETAILED DESCRIPTION

Figure 1:
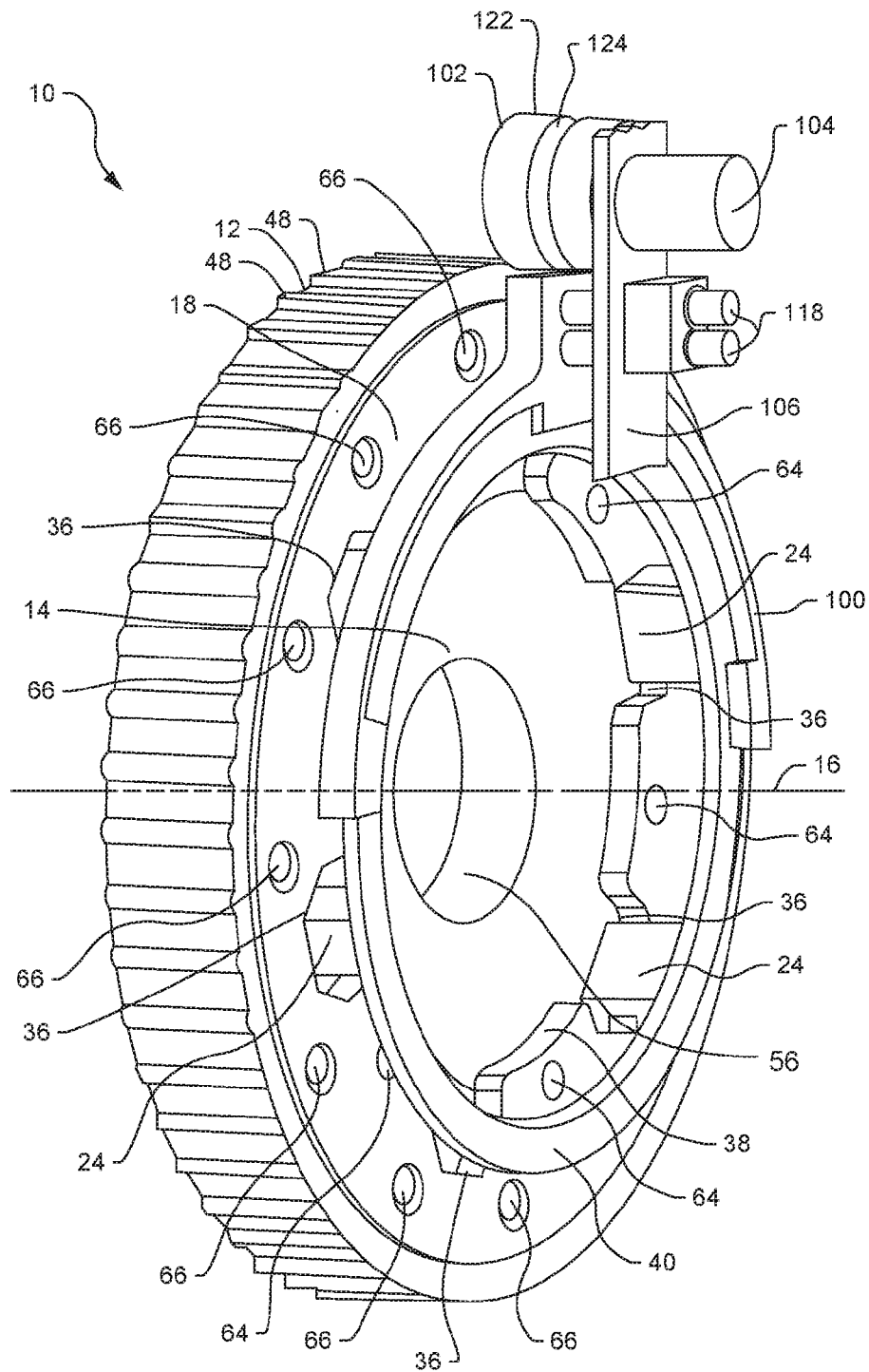
FIG. 1 is an isometric view of a rotary MMCM having a stationary actuator in accordance with the present disclosure.
Figure 2:
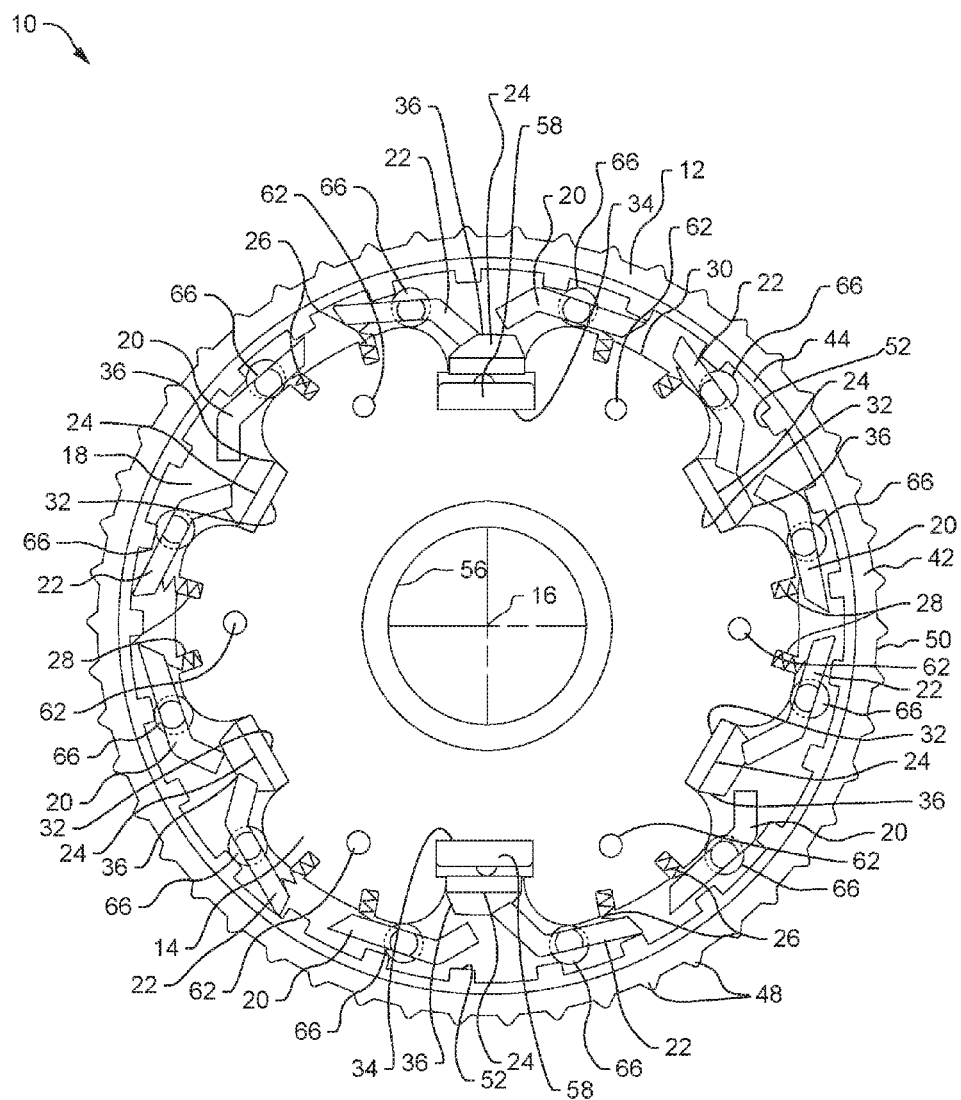
FIG. 2 is a front view of MMCM of FIG. 1 with a near side plate removed to illustrate internal components of the MMCM.

FIGS. 1 and 2 illustrate an embodiment of a MMCM 10 that can be used to connect a first rotating component (not shown) to a second rotating component (not shown) in a machine, such as a transmission of a vehicle. The MMCM 10 may include an outer race or notch ring 12 to which the first rotating component is connected, and an inner race 14 to which the second rotating component is connected. The notch ring 12 and the inner race 14 are concentrically aligned along a clutch rotational axis 16 that is also common to the rotating components when the MMCM 10 is installed. The inner race 14 may be disposed between and connected for rotation with a pair of side plates 18 (one shown in FIGS. 1 and 2) that maintain the inner race 14 in an approximately fixed axial location relative to the notch ring 12 as the second rotating component drives the inner race 14 and the side plates 18.

The locking and unlocking modes of the MMCM 10 may be controlled by a plurality of pawls 20, 22 (FIG. 2) and corresponding cams 24. In the illustrated embodiment, the pawls 20, 22 are pivotally mounted between the side plates 18 for rotation about pawl axes (not identified) that are parallel to the clutch rotational axis 16 of the MMCM 10. The first pawls 20 may selectively rotate into engagement with the notch ring 12 to prevent the inner race 14 and the second rotating component from rotating in a first direction (clockwise as shown in FIG. 2) relative to the notch ring 12 and the first rotating component. Similarly, the second pawls 22 may selectively rotate into engagement with the notch ring 12 to prevent inner race 14 and the second rotating component from rotating in a second direction (counter-clockwise as shown in FIG. 2) relative to the notch ring 12 and the first rotating component. Each of the pawls 20, 22 may be biased toward engagement with the notch ring 12 by a corresponding pawl spring 26 compressed between the pawl 20, 22 and a spring notch 28 along an outer edge 30 of the inner race 14.

Each first pawl 20 may be paired with a corresponding one of the second pawls 22 so that the paired pawls 20, 22 may both be acted upon by one of the cams 24 to rotate between their engaged/locked positions and their disengaged/unlocked positions. The cams 24 may be disposed within cam notches 32, 34 in the inner race outer edge 30 and corresponding cam recesses 36 in side plate inner edges 38 proximate the corresponding pawls 20, 22. The cams 24 may be connected for coordinated movement by a cam ring 40 disposed on one side of the MMCM 10 and outside one of the side plates 18. The cam notches 32, 34 and/or the cam recesses 36 may engage the cams 24 so that the cams 24 and the cam ring 40 rotate with the inner race 14, the side plates 18 and the pawls 20, 22 as a single inner race assembly (not numbered) relative to the notch ring 12. At the same time, the cams 24 are slidable within the cam notches 32, 34 and the cam recesses 36 parallel to the clutch rotational axis 16 of the MMCM 10.

Those skilled in the art will understand that the pivoting pawls 20, 22 of the illustrated embodiment are exemplary. Pawls coupled to the inner race 14 and movable in radial or axial translation, rotation or other complex motions relative to the inner race 14 and into and out of engagement with the notch ring 12 are contemplated by the inventor as having use in MMCMs 10 in accordance with the present disclosure. Moreover, in other alternative embodiments, the pawls 20, 22 may be mounted on the outer race 12 and movable into and out of engagement with the inner race 14 to alternately lock the races 12, 14 for rotation together and unlock the races 12, 14 for relative rotation with respect to each other. The mechanisms for moving the pawls 20, 22 disclosed herein may be modified accordingly for control of the pawls 20, 22 when mounted on the outer race 12.

The outer race or notch ring 12 is shown in greater detail in FIG. 3. The notch ring 12 may include an annular outer ring 42 and an annular inner ring 44 extending radially inwardly from an inward surface 46 of the outer ring 42. The inner ring 44 may have a narrower width that the outer ring 42 so that the inner ring 44 may be captured between the side plates 18 when the inner race assembly is assembled to maintain the notch ring 12 and the inner race 14 in an approximately constant position along the clutch rotational axis 16 of the MMCM 10. The notch ring 12 may further include a plurality of outer teeth 48 extending radially outwardly from and circumferentially spaced about a radially outward surface 50 of the outer ring 42. The outer teeth 48 may be arranged to mesh with and engage corresponding teeth or other structures of the first rotating component so that the notch ring 12 and the component rotate together. A plurality of inner teeth 52 may extend radially inwardly from and be circumferentially spaced about an inward surface 54 of the inner ring 44. The inner teeth 52 will be engaged by the pawls 20, 22 to lock the notch ring 12 and the inner race 14 against relative rotation when the pawls 20, 22 are in their locked positions as will be discussed further below.

The inner race 14 as described above is illustrated in greater detail in FIG. 4. The inner race 14 is a generally circular plate having an inner race central opening 56 aligned along the clutch rotational axis 16 and configured for connection of the second rotating component. The cam notches 32 are shaped to slidably receive the corresponding cams 24 therein. The cam notches 34 have a different configuration that allows the cam notches 34 to also receive a detent block 58 therein. As shown in FIG. 5, the detent block 58 may include a detent member 60 extending outwardly therefrom that will engage recesses in a corresponding one of the cams 24 to ensure that the cams 24 are correctly positioned in each of the lock modes of the MMCM 10 as will be illustrated and described further below. The cam notches 34 and the detent blocks 58 are sized so that the detent blocks 58 may be press fit into the cam notches 34 and retained in place as the cams 24 move axially within the cam notches 34. Returning to FIG. 4, the inner race 14 may further include a plurality of locking rod openings 62 circumferentially spaced about the inner race 14 that may receive corresponding locking rods (not shown) that will constrain the inner race 14 and the side plates 18 to rotate together about the clutch rotational axis 16.

As shown in FIG. 6, each side plate 18 is a generally annular plate having a side plate inner edge 38 with the cam recesses 36 defined there in. The cam recesses 36 are circumferentially spaced about the side plate inner edge 38 to align with corresponding ones of the cam notches 32, 34 when the inner race assembly is assembled. The side plates 18 have a plurality of locking rod openings 64 circumferentially spaced about the side plates 18 to correspond to the locking rod openings 62 of the inner race 14. During assembly, locking rods or other alignment mechanisms may be inserted through the locking rod openings 62, 64 to align the cam notches 32, 34 with the cam recesses 36, and to constrain the inner race 14 and the side plates 18 to rotate together about the clutch rotational axis 16. Each of the side plates 18 further includes a plurality of pawl arm openings 66 circumferentially spaced about the side plates 18 proximate a side plate outer edge 68. The pawl arm openings 66 may be sized to receive corresponding pivot arms of the pawls 20, 22 so that the pawls 20, 22 are suspended between the side plates 18 and are pivotable relative to the side plates 18 and the inner race 14 between their locked and unlocked positions.

The inner race assembly may capture the notch ring 12 in a manner that allows relative rotation of the notch ring 12 and the inner race 14 while maintaining their relative positions along the clutch rotational axis 16. The side plates 18 have an outer diameter that is slightly less than an inner diameter of the outer ring 42 so that the side plates 18 fit within the outer ring 42 without rubbing against the inward surface 46. The outer diameter of the side plates 18 is greater than an inner diameter of the inner ring inward surface 54 so that the inner ring 44 and the inner teeth 52 are captured between the side plates 18. Additionally, the inner race 14 may have a thickness that is greater a thickness of the inner ring 44 and the inner teeth 52 so that the side plates 18 are spaced apart sufficiently so that the inner ring 44 is not pinched between side plates 18 and friction between the notch ring 12 and the inner race 14 and resistance to their relative rotation is minimized. The illustrated embodiment is exemplary of relative sizes of the notch ring 12, the inner race 14 and the side plates 18. Alternative configurations of the MMCM 10 are contemplated where the notch ring 12 and the inner race 14 are concentric and axially aligned with the pawls 20, 22 rotating with the inner race 14 and being movable into and out of engagement with the notch ring 12.

FIG. 7 illustrates an embodiment of the pawls 20, 22 of the inner race assembly. Each of the pawls 20, 22 may have a similar configuration, and be oriented as shown in FIG. 2 during assembly to ensure that the pawls 20 lock the inner race 14 against rotation relative to the notch ring 12 in one direction, and the pawls 20 to lock the inner race 14 against rotation relative to the notch ring 12 in the opposite direction. The pawls 20, 22 may have a pawl body 70 having a pair of pawl pivot arms 72, 74 extending outwardly from the pawl body 70 in opposite directions. The pawl pivot arms 72, 74 may be generally cylindrical and sized to be received within the pawl arm openings 66 of the side plates 18 so that the pawls 20, 22 can pivot about an axis that is approximately parallel to the clutch rotational axis 16 of the MMCM 10. One end of the pawl body 70 may terminate in a tooth engagement tip 76 that will be disposed proximate the inward surface 54 of the notch ring 12 and engage one of the inner teeth 52 when the pawl 20, 22 is rotated to its locked position. Opposite the tooth engagement tip 76, a camming end 78 may extend outwardly from the pawl body 70 and be configured to be engaged by the corresponding cam 24 to rotate the pawls 20, 22 between the locked and unlocked positions.

The cams 24 and the cam ring 40 are illustrated in greater detail in FIG. 8. As will be discussed further below, the cams 24 extend from a surface 80 of the cam ring 40 proximate a cam ring inner edge 82 so that an area proximate a cam ring outer edge 84 is free of obstruction. Each of the cams 24 includes a camming surface 86 that will engage the camming ends 78 of the corresponding pawls 20, 22 to control the rotational position of the pawls 20, 22 is the cams 24 slide within the cam notches 32, 34. The cams 24 may further include detent recesses 88 in inward surfaces 90 that will face the detent blocks 58 when the inner race assembly is assembled and receive the detent members 60 when the cams 24 are in discrete positions placing the pawls 20, 22 in corresponding ones of the locking modes of the MMCM 10.

Returning to FIG. 1, a mode shift execution assembly for the MMCM 10 may include a shift ring 100 at least partially encircling the cam ring 40, a shift drum 102 operatively coupled to the shift ring 100 to cause the shift ring 100 to move parallel to the clutch rotational axis 16 when the shift drum 102 rotates, and an actuator 104 operatively coupled to the shift drum 102 to apply torque to the shift drum 102 and cause the shift drum 102 to rotate in response to actuator control signals indicating a direction and speed of rotation. During rotation of the rotating components connected by the MMCM 10, the clutch rotational axis 16, and correspondingly the notch ring 12 and the inner race 14, may remain in a substantially fixed position relative to the structure of the machine in which the MMCM 10 is implemented, with the notch ring 12 and the inner race 14 rotating about the clutch rotational axis 16 with the corresponding rotating components. The mode shift execution assembly may also be constrained to a substantially fixed position by connecting the components to a mounting plate 106 that is connected to a frame, housing or other stationary component of the machine.

Figure 9:
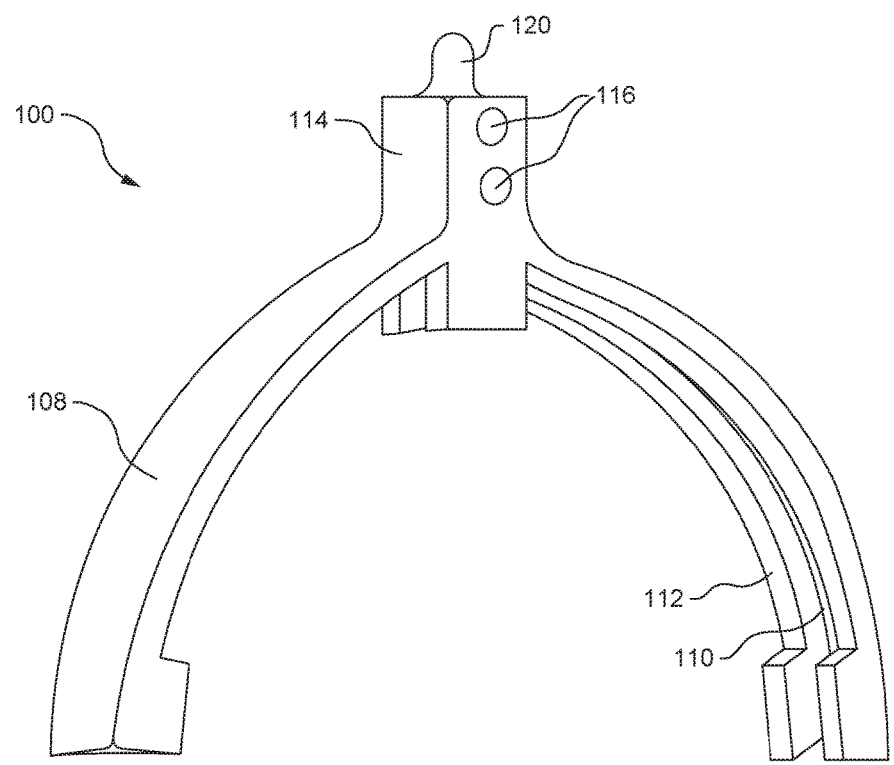
FIG. 9 is an isometric view of a shift ring in accordance with the present disclosure of the MMCM of FIG. 1.

The shift ring 100 is shown in greater detail in FIG. 9. The shift ring 100 may include a circular or semi-circular cam ring engaging portion 108 that wraps partially around the cam ring 40 when the MMCM 10 is assembled. The cam ring engaging portion 108 may have an annular groove 110 defined in a shift ring inner surface 112. An inner diameter of the inner surface 112 may be less than an outer diameter of the cam ring 40, and the annular groove 110 may be deep enough into the cam ring engaging portion 108 so that the cam ring 40 is disposed within the annular groove 110 with clearance for the cam ring outer edge 84. At the same time, the inner diameter of the inner surface 112 may be large enough to provide clearance between the inner surface 112 and the cams 24 extending from the cam ring 40. A width of the annular groove 110 may be greater than a thickness of the cam ring 40 to provide an air gap between the cam ring 40 and the annular groove 110 when the MMCM 10 is in position for one of the locking modes as will be described more fully below.

The shift ring 100 may further include a mounting portion 114 extending from the cam ring engaging portion 108 and configured to operatively connect the shift ring 100 to the mounting plate 106. In the illustrated embodiment, the mounting portion 114 includes two guide rod openings 116 for slidably receiving guide rods 118 (FIG. 1) extending from the mounting plate 106 that will constrain the shift ring 100 to linear movement parallel to the clutch rotational axis 16 of the MMCM 10. The shift ring 100 further includes a shift ring cam follower 120 extending from the mounting portion 114 that will be operatively coupled to the shift drum 102 to move the shift ring 100 and the cam ring 40 between the discrete locking positions.

Figure 10:
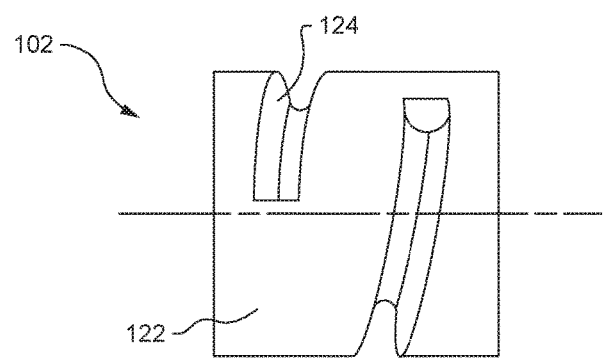
FIG. 10 is a side view of a shift drum in accordance with the present disclosure of the MMCM of FIG. 1.

An embodiment of the shift drum 102 is shown in FIG. 10. The shift drum 102 has a cylindrical shape and is rotationally mounted on the mounting plate 106 for rotation about an axis that is parallel to the clutch rotational axis 16. An outer surface 122 of the shift drum 102 may define a shift drum camming groove 124 extending circumferentially around the shift drum 102. The shift drum camming groove 124 may have a helical shape so that the camming groove 124 progresses axially along the outer surface 122 as the camming groove 124 extends around the shift drum 102. The camming groove 124 may have the shift ring cam follower 120 disposed therein so that the shift ring 100 and the cam ring 40 will move linearly parallel to the clutch rotational axis 16 when the actuator 104 rotates the shift drum 102 and the camming groove 124 forces the shift ring 100 to slide along the guide rods 118. The camming groove 124 may have a constant pitch so that its axial position and the axial position of the shift ring 100 and the cam ring 40 change at a fixed rate as the shift drum 102 is rotated by the actuator 104.

The actuator 104 may be any appropriate actuator that produces rotary motion when a signal is transmitted thereto. For example, the actuator 104 may be a hydraulic actuator, a solenoid actuator, a stepper motor or any other device that can rotate between discrete angular positions and cause the shift drum 102 to rotate. The actuator 104 may be operatively connected to a control device that can output control signals, variable current, variable fluid flow or other inputs that can cause the actuator 104 to rotate between predetermined discrete angular positions that will cause the cams 24 to move to the discrete positions of the locking modes of the MMCM 10. Of course, the actuator 104 could be a linear actuator or other type of actuator having a non-rotation output movement so long as the actuator is actuatable between discrete positions, fixed relative to the frame or housing of the machine, and operatively connected to the shift drum 102 by lever arms, a linkage assembly or other appropriate connection mechanism in a manner that converts the output movement of the actuator 104 into torque on and rotation of the shift drum 102 between the discrete angular positions.

Figure 11:
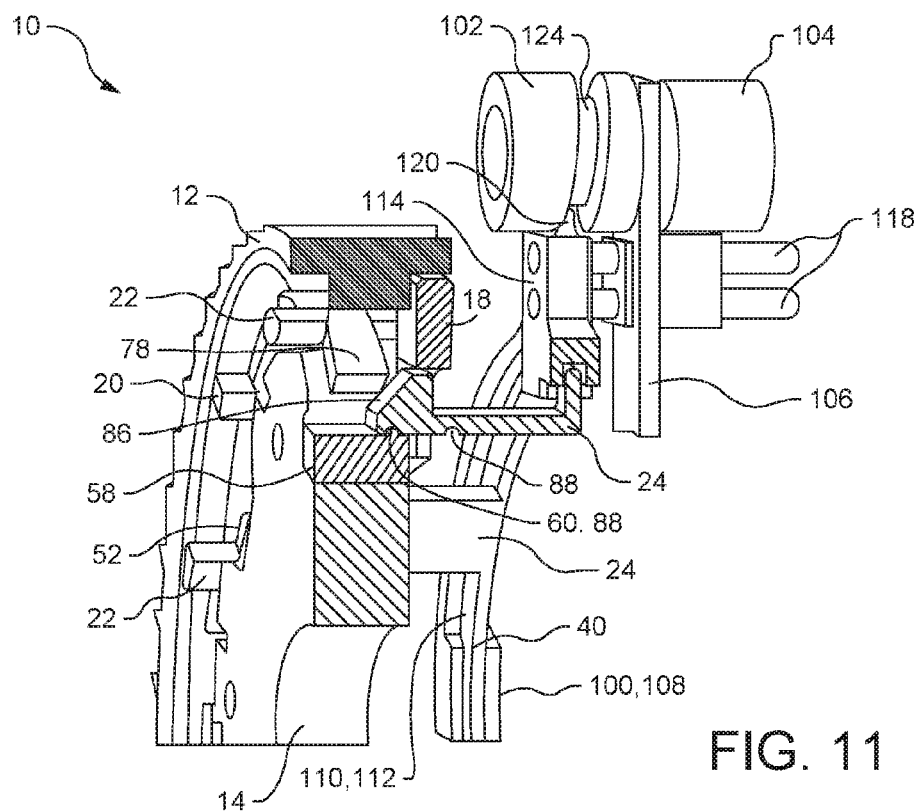
FIG. 11 is a partial cross-sectional isometric view the MMCM of FIG. 1 with the near side plate removed and the MMCM in a two-way locked mode.

The operation of the MMCM 10 will be illustrated and described with reference to FIGS. 11 and 12. In FIG. 11, the MMCM 10 is illustrated in a two-way locked mode wherein the notch ring 12 and the inner race 14 are locked for rotation together in the clockwise and the counterclockwise directions. The shift ring 100 and the cam ring 40 are positioned axially away from the notch ring 12 and the inner race 14 so that the camming surfaces 86 of the cams 24 are not engaging the camming ends 78 of the pawls 20, 22. Without the cams 24 displacing the camming ends 78, the pawls 20, 22 are biased toward their locked positions with the tooth engagement tips 76 positioned to engage the inner teeth 52 of the notch ring 12. The detent members 60 of the detent blocks 58 are disposed within the detent recesses 88 of the cams 24 corresponding to the two-way locked mode of the MMCM 10 to ensure that the cams 24 are correctly positioned. At the same time, the shift drum 102 has been rotated to a first prescribed angular position for the two-way locked mode by the actuator 104 so that the portion of the inner surface 112 defining the annular groove 110 in the cam ring engaging portion 108 of the shift ring 100 is spaced from the cam ring 40 so that the cam ring 40 is free to rotate with the inner race 14 without drag from friction between the cam ring 40 and the inner surface 112.

Figure 12:
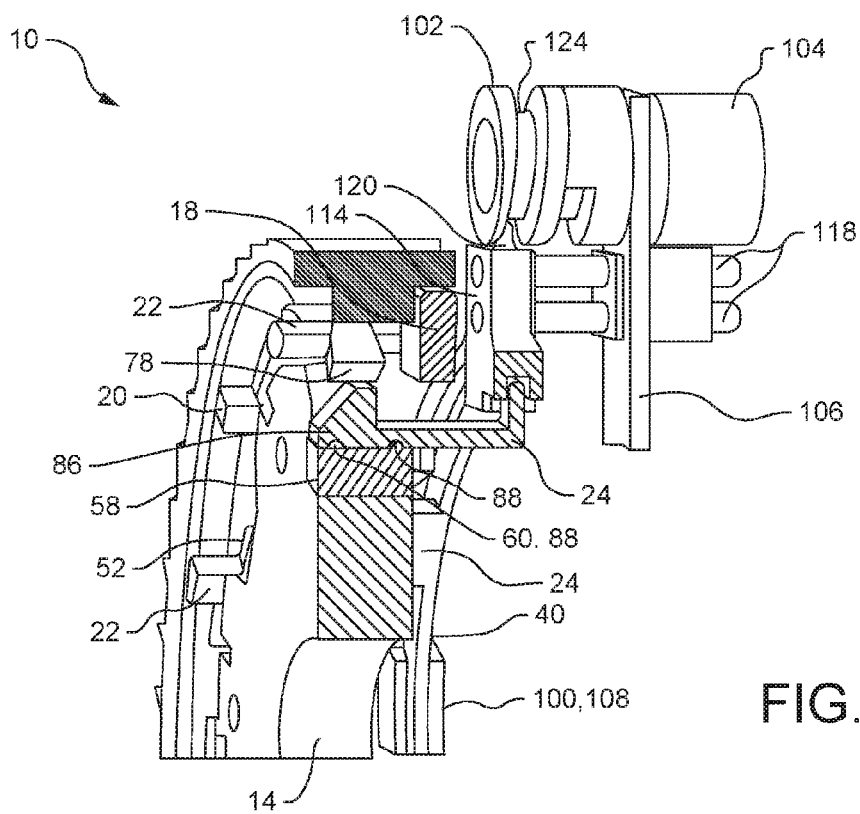
FIG. 12 is the partial cross-sectional isometric view the MMCM of FIG. 11 in a two-way unlocked mode.

When the MMCM 10 is to be transitioned to a two-way unlocked mode shown in FIG. 12, appropriate signals are transmitted to the actuator 104 to actuate and rotate the shift drum 102 to a second prescribed angular position for the two-way unlocked mode. As the actuator 104 rotates the shift drum 102 toward the second prescribed angular position, the point of engagement between the camming groove 124 and the shift ring cam follower 120 moves axially toward the notch ring 12 and the inner race 14. The engagement between the camming groove 124 and the shift ring cam follower 120 causes the shift ring 100 to slide axially along the guide rods 118. The annular groove 110 of the shift ring 100 will first move into engagement with the cam ring 40, and then push the cam ring 40 and the cams 24 so that the detent recesses 88 for the two-way lock mode move past the detent member 60 and the camming surfaces 86 of the cams 24 move into engagement with the camming ends 78 of the pawls 20, 22. The camming surfaces 86 cause the pawls 20, 22 to rotate against the biasing forces of the pawl springs 26 and out of engagement with the inner teeth 52 of the notch ring 12. As the shift ring 100 and the cam ring 40 continue to move axially, the detent recesses 88 corresponding to the two-way unlocked mode of the MMCM 10 will approach and receive the corresponding detent members 60 and the cams 24 will snap in place in their two-way unlocked position with the detent members 60 disposed in the detent recesses 88 for proper alignment. The actuator 104 will eventually stop the shift drum 102 at the second predetermined angular position shown in FIG. 12 with the inner surface 112 defining the annular groove 110 spaced from the cam ring 40 for rotation of the cam ring 40 without drag from friction. When the MMCM 10 returns to the two-way locked mode of FIG. 11, the actuator 104 rotates the shift drum 102 in the opposite direction toward the first prescribed angular position to cause the cams 24 to disengage from the pawls 20, 22.

FIGS. 13 and 14 illustrate an alternative embodiment of an MMCM 130 having a modified mode shift execution assembly. Referring to FIG. 13, the notch ring 12, the inner race 14 and the other components of the inner race assembly may be configured in a similar manner as described above. The mode shift execution assembly of the MMCM 130 may include a shift ring 132 encircling the cam ring 40. The shift ring 132 may be operatively connected to the frame or housing of the machine so that the shift ring 132 is concentric with the notch ring 12 and the inner race 14 on the clutch rotational axis 16 and can translate parallel to the clutch rotational axis 16, while also being constrained to prevent rotation about the clutch rotational axis 16. A shift drum 134 may also be concentric with the notch ring 12, the inner race 14 and the shift ring 132 about the clutch rotational axis 16 and may include a helical camming groove 136 similar to the camming groove 124 of the shift drum 102 as described above.

Referring to the cross-sectional view of FIG. 14, the shift ring 132 may be formed from multiple components 138, 140 that are assembled around the cam ring 40. In the illustrated embodiment, the components 138, 140 are annular discs that may be disposed on either side of the cam ring 40 and connected to form the shift ring 132 and to define an annular groove 142 surrounding the cam ring 40. The annular groove 142 may have a similar configuration as the annular groove 110 of the shift ring 100, with an inner diameter that is greater than the outer diameter of the cam ring 40 and a width of the annular groove 142 may be greater than the thickness of the cam ring 40 to reduce friction and drag when the cam ring 40 rotates relative to the shift ring 132. The shift ring 132 further includes a cam follower 144 extending inwardly into a shift drum opening 146 in which the shift drum 134 is disposed, with the cam follower 144 being received within the camming groove 136 of the shift drum 134. Other arrangements are contemplated for installing the shift ring 132 on the cam ring 40. For example, the annular shift ring 132 may be divided into two semi-circular half rings that may each be similar to the cam ring engaging portion 108 of the shift ring 100. The half rings may be placed around the cam ring 40 with their ends connected to form the shift ring 132. In a further alternative, the shift ring 132 may be formed around the cam ring 40 as a single unitary component by a process such as three dimensional printing. Additional alternatives will be apparent to those skilled in the art and are contemplated by the inventor.

The shift drum 134 may have a generally similar configuration as the shift drum 102 and have the helical camming groove 136 extending around an outer surface 148 of the shift drum 134. The shift drum 134 have a shift drum opening 150 centered on the clutch rotational axis 16 and configured so that the second rotating component of the machine connected to the inner race 14 may pass there through. The shift drum 134 may be operatively connected to the frame or housing of the machine so that the shift drum 134 is centered on the clutch rotational axis 16 and constrained to a fixed axial position relative to the notch ring 12 and the inner race 14, while also being free to rotate about the clutch rotational axis 16. The shift drum 134 may have an actuator (not shown), such as the actuator 104, that is mounted in a stationary position relative to the frame or housing of the machine and operatively connected to the shift drum 134 to cause the shift drum 134 to rotate between prescribed angular positions corresponding to the available locking modes of the MMCM 130. The actuator may be directly coupled to the shift drum 134, such as to the outer surface 148, or indirectly coupled thereto by an intermediate linkage, gears or other mechanism that can convert the rotation of the actuator into rotation of the shift drum 134.

The operation of the MMCM 130 to shift between the available locking modes is generally similar to the process described above. The actuator is actuated to rotate the shift drum 134, and the engagement between the camming groove 136 and the cam follower 144 causes the shift ring 132 and the cam ring 40 to translate parallel to the clutch rotational axis 16 between the locking mode positions. The MMCM 130 is illustrated in a two-way unlocked mode similar to that illustrated in FIG. 12 and described in the accompanying text. FIG. 14 more clearly illustrates the interaction between the detent members 60 and the detent recesses 88 of the cams 24. The rightmost detent recesses 88 have received the detent members 60 therein to align the cams 24 in the two-way locked mode position. Similarly, the leftmost detent recesses 88 will receive the detent members 60 as the cams 24 move to the right as shown toward the two-way unlocked mode position and snap the cams 24 and cam ring 40 into the proper position so that the cam ring 40 is not in contact with the annular groove 142 of the shift ring 132.

In the preceding embodiments, the cams 24 are configured to provide two locking modes in the MMCMs 10, 130. In alternative embodiments, the MMCMS 10, 130 may be configured to provide up to four locking modes by varying the configurations from the cams 24 and their camming surfaces 86 illustrated and described above. For example, FIG. 15 illustrates an embodiment of a cam 160 configured to provide four locking modes in the MMCMs 10, 130. The following discussion uses the convention of FIG. 2 wherein the pawls 20 control relative rotation of the inner race 14 relative to the notch ring 12 in the clockwise direction, and the pawls 22 control relative rotation of the inner race 14 relative to the notch ring 12 in the counterclockwise direction. The cam 160 may include a camming surface 162 having a first camming surface portion 164 that will interact with the camming end 78 of the corresponding pawl 20, and a second camming surface portion 166 that will interact with the camming end 78 of the corresponding pawl 22. The cam 160 may further include four detent recesses (not shown) that will receive the detent member 60 to align the cam 160 in the corresponding locking mode positions.

In a two-way locked mode, the cam 160 may be positioned so that the camming ends 78 of both pawls 20, 22 are disposed beyond the camming surface 162, and the pawls 20, 22 are rotated to their engaged or locked positions by the pawl springs 26 to lock the inner race 14 to the notch ring 12 for rotation in both directions. In a counterclockwise locking area 168 of the camming surface 162 for a one-way counterclockwise locked mode, the first camming surface portion 164 engages the camming end 78 of the pawl 20 to rotate the pawl 20 to the unlocked position that will allow the inner race 14 to rotate in the clockwise direction. The second camming surface portion 166 does not extend into the counterclockwise locking area 168, so the pawl 22 remains in the locked position and the inner race 14 cannot rotate in the counterclockwise direction relative to the notch ring 12. In a two-way unlocking area 170 of the camming surface 162 for a two-way unlocked mode, both camming surface portions 164, 166 engage the corresponding camming ends 78 of the pawl 20, 22 to rotate the pawls 20, 22 to the unlocked positions that will allow the inner race 14 to rotate in either direction relative to the notch ring 12. Finally, in a clockwise locking area 172 of the camming surface 162 for a one-way clockwise locked mode, the second camming surface portion 166 engages the camming end 78 of the pawl 22 to rotate the pawl 22 to the unlocked position that will allow the inner race 14 to rotate in the counterclockwise direction. The first camming surface portion 164 does not extend into the clockwise locking area 172, so the pawl 20 remains in the locked position and the inner race 14 cannot rotate in the clockwise direction relative to the notch ring 12.

The control mechanism for controlling the operation of MMCMs 10, 130 may be configured to cause the cams 160 to be moved to the required position for each of the available locking modes. The control mechanism transmits actuation signals to the actuators 104 to rotate the shift drums 102, 134 to the discrete angular positions necessary to cause the shift rings 100, 132 to position the cams 160 for the camming surface 162 to engage the pawls 20, 22 according to the commanded locking mode. Of course, the locations of the positions and the number of positions for the cams 24, 160 will vary on based on factors such as the number of locking modes provided by the MMCMs 10, 130, the shape of the camming surfaces 86, 162 to achieve a particular sequence of transitions between the available locking modes, and the like.

INDUSTRIAL APPLICABILITY

The MMCMs 10, 130 in accordance with the present disclosure facilitate rotation of both the notch ring 12 and the inner race 14 with the rotating components to which they are connected while the actuator 104 for changing the locking modes of the MMCMs 10, 130 remains stationary relative to the frame or the housing of the machine in which the MMCMs 10, 130 are implemented. Where the actuator 104 is an electro-mechanical device, this arrangement can eliminate the risk of electrical wires running to the actuator 104 getting twisted around the rotating components connected by the MMCMs 10, 130. Similar risks are eliminated in hydraulic actuators having fluid conduits providing hydraulic fluids that could get tangled if the actuator 104 was operative coupled to move with the rotating components or reducing the complexity of the feeds to the rotating component. Stationary actuators 104 may also have a place and purpose in mechanically actuated MMCMs 10, 130.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A clutch module for coupling a first rotating component and a second rotating component of a machine to each other, the clutch module comprising:

an outer race configured to be coupled to and to rotate with the first rotating component, wherein the outer race is rotatable in both directions about a clutch rotational axis;

an inner race configured to be coupled to and to rotate with the second rotating component, wherein the inner race is concentrically aligned with the outer race and rotatable in both directions relative to the outer race about the clutch rotational axis;

a first pawl operatively coupled to one of the inner race and the outer race to rotate therewith and to move between a first pawl locked position where the first pawl engages to prevent rotation of the inner race relative to the outer race in a first direction and a first pawl unlocked position where the first pawl is disengaged to allow rotation of the inner race relative to the outer race in the first direction;

a first cam operatively coupled to the one of the inner race and the outer race to rotate therewith and to translate relative to the inner race and the outer race parallel to the clutch rotational axis;

a shift ring operatively coupled to a stationary structure of the machine and constrained to translate parallel to the clutch rotational axis, and operatively coupled to the first cam so that translation of the shift ring causes translation of the first cam and so that the first cam can rotate about the clutch rotational axis relative to the shift ring;

a shift drum operatively coupled to the stationary structure of the machine and constrained to rotate about a shift drum axis that is parallel to the clutch rotational axis, wherein the shift drum is operatively coupled to the shift ring so that rotation of the shift drum causes the shift ring and the first cam to translate, wherein the shift drum is rotatable to a first angular position wherein the first cam is disengaged from the first pawl and the first pawl is in the first pawl locked position, and wherein the shift drum is rotatable to a second angular position wherein the first cam engages the first pawl to move the first pawl to the first pawl unlocked position; and wherein the inner race further comprises at least one cam notch, and wherein the at least one cam notch contains a detent block for ensuring correct positioning of the first cam in the first pawl locked position.

2. The clutch module of claim 1, comprising an actuator operatively coupled to the stationary structure of the machine and constrained against rotation and translation, operatively coupled to the shift drum, and actuatable to rotate the shift drum about the shift drum axis between the first angular position and the second angular position.

3. The clutch module of claim 1, wherein the shift drum comprises a cylindrical outer surface and a camming groove defined in the cylindrical outer surface, wherein the camming groove is helical so that the camming groove extends axially along the cylindrical outer surface as the camming groove extends around the shift drum.

4. The clutch module of claim 3, wherein the shift ring comprises a shift ring cam follower extending therefrom and disposed within the camming groove of the shift drum with the camming groove engaging the shift ring cam follower to cause the shift ring and the first cam to translate as the shift drum rotates between the first angular position and the second angular position.

5. The clutch module of claim 4, wherein the shift ring cam follower extends radially outwardly relative to the clutch rotational axis, and wherein the shift drum axis is not coincident with the clutch rotational axis.

6. The clutch module of claim 4, wherein the shift ring cam follower extends radially inwardly relative to the clutch rotational axis.

7. The clutch module of claim 6, wherein the shift drum axis is coincident with the clutch rotational axis.

8. The clutch module of claim 1, comprising a cam ring having an annular shape and oriented concentrically with the outer race and the inner race about the clutch rotational axis, wherein the first cam extends axially from the cam ring and the cam ring is operatively coupled to the shift ring to translate with the shift ring and to rotate about the clutch rotational axis relative to the shift ring.

9. The clutch module of claim 8, wherein the shift ring has a semi-circular shape and comprises an annular groove receiving and engaging a portion of the cam ring.

10. The clutch module of claim 8, wherein the shift ring has a circular shape and encircles the cam ring, and comprises an annular groove receiving and engaging a portion of the cam ring.

11. The clutch module of claim 1, comprising a second pawl operatively coupled to one of the inner race and the outer to rotate therewith and to move between a second pawl locked position where the second pawl engages to prevent rotation of the inner race relative to the outer race in a second direction and a second pawl unlocked position where the second pawl is disengaged to allow rotation of the inner race relative to the outer race in the second direction, wherein the first cam is disengaged from the second pawl and the second pawl is in the second pawl locked position when the shift drum is in the first angular position, and wherein the first cam engages the second pawl to move the second pawl to the second pawl unlocked position when the shift drum is in the second angular position.

12. The clutch module of claim 11, wherein the shift drum is rotatable to a third angular position wherein the first cam is disengaged from the first pawl and the first pawl is in the first pawl locked position, and the first cam engages the second pawl to move the second pawl to the second pawl unlocked position.

13. The clutch module of claim 12, wherein the shift drum is rotatable to a fourth angular position wherein the first cam engages the first pawl and the first pawl is in the first pawl unlocked position, and the first cam is disengaged from the second pawl and the second pawl is in the second pawl locked position.

14. A clutch module for coupling a first rotating component and a second rotating component of a machine to each other, the clutch module comprising:

an outer race configured to be coupled to and to rotate with the first rotating component, wherein the outer race is rotatable in both directions about a clutch rotational axis;

an inner race configured to be coupled to and to rotate with the second rotating component, wherein the inner race is concentrically aligned with the outer race and rotatable in both directions relative to the outer race about the clutch rotational axis;

a first pawl operatively coupled to one of the inner race and the outer race to rotate therewith and to move between a first pawl locked position where the first pawl engages to prevent rotation of the inner race relative to the outer race in a first direction and a first pawl unlocked position where the first pawl is disengaged to allow rotation of the inner race relative to the outer race in the first direction;

a second pawl operatively coupled to the one of the inner race and the outer race to rotate therewith and to move between a second pawl locked position where the second pawl engages to prevent rotation of the inner race relative to the outer race in a second direction and a second pawl unlocked position where the second pawl is disengaged to allow rotation of the inner race relative to the outer race in the second direction;

a first cam operatively coupled to the one of the inner race and the outer race to rotate therewith and to translate relative to the inner race and the outer race parallel to the clutch rotational axis;

a cam ring having an annular shape and oriented concentrically with the outer race and the inner race about the clutch rotational axis, wherein the first cam extends axially from the cam ring so that the cam ring rotates with the one of the inner race and the outer race and the cam ring and the first cam translate together relative to the inner race and the outer race parallel to the clutch rotational axis;

a shift ring operatively coupled to a stationary structure of the machine and constrained to translate parallel to the clutch rotational axis, and operatively coupled to the cam ring so that translation of the shift ring causes translation of the cam ring and the first cam, and so that the cam ring is rotatable about the clutch rotational axis relative to the shift ring;

a shift drum operatively coupled to the stationary structure of the machine and constrained to rotate about a shift drum axis that is parallel to the clutch rotational axis, wherein the shift drum is operatively coupled to the shift ring so that rotation of the shift drum causes the shift ring, the cam ring and the first cam to translate, wherein the shift drum is rotatable to a first angular position wherein the first cam is disengaged from the first pawl and the first pawl is in the first pawl locked position and disengaged from the second pawl and the second pawl is in the second pawl locked position, and wherein the shift drum is rotatable to a second angular position wherein the first cam engages the first pawl to move the first pawl to the first pawl unlocked position and engages the second pawl to move the second pawl to the second pawl unlocked position; and wherein the inner race further comprises at least one cam notch, and wherein the at least one cam notch contains a detent block for ensuring correct positioning of the first cam in the first pawl locked position.

15. The clutch module of claim 14, comprising an actuator operatively coupled to the stationary structure of the machine and constrained against rotation and translation, operatively coupled to the shift drum, and actuatable to rotate the shift drum about the shift drum axis between the first angular position and the second angular position.

16. The clutch module of claim 14, wherein the shift drum comprises a cylindrical outer surface and a camming groove define in the cylindrical outer surface, wherein the camming groove is helical so that the camming groove extends axially along the cylindrical outer surface as the camming groove extends around the shift drum.

17. The clutch module of claim 16, wherein the shift ring comprises a shift ring cam follower extending therefrom and disposed within the camming groove of the shift drum with the camming groove engaging the shift ring cam follower to cause the shift ring and the first cam to translate as the shift drum rotates between the first angular position and the second angular position.

18. The clutch module of claim 14, wherein the shift drum axis is coincident with the clutch rotational axis.

19. The clutch module of claim 14, wherein the shift drum is rotatable to a third angular position wherein the first cam is disengaged from the first pawl and the first pawl is in the first pawl locked position, and the first cam engages the second pawl to move the second pawl to the second pawl unlocked position.

20. The clutch module of claim 19, wherein the shift drum is rotatable to a fourth angular position wherein the first cam engages the first pawl and the first pawl is in the first pawl unlocked position, and the first cam is disengaged from the second pawl and the second pawl is in the second pawl locked position.

* * * * *